March 23, 1954 G. R. BAYLEY 2,672,942
AUTOMOTIVE VEHICLE HOOD EDGE BUMPER
Filed Feb. 2, 1950 2 Sheets-Sheet 1

Inventor
George R. Bayley.
By Willis, Helmig & Baillio
Attorneys

March 23, 1954     G. R. BAYLEY     2,672,942
AUTOMOTIVE VEHICLE HOOD EDGE BUMPER
Filed Feb. 2, 1950     2 Sheets-Sheet 2

Inventor
George R. Bayley
By
Willits, Helmig & Baillio
Attorneys

Patented Mar. 23, 1954

2,672,942

UNITED STATES PATENT OFFICE 2,672,942

AUTOMOTIVE VEHICLE HOOD EDGE BUMPER

George R. Bayley, Flint, Mich., assignor to General Motors Corporation, Detroit, Mich., a corporation of Delaware Application February 2, 1950, Serial No. 142,037

7 Claims. (Cl. 180—69)

1

This invention relates to automotive vehicle bodies and particularly to compartments therein and their closure members, for example, the engine compartment and hood.

While the invention is hereinafter described as applied to a particular form of engine compartment hood commonly referred to as the one-piece side opening type, the invention may be applied as well to other types of engine hoods as well as other compartments and their closure members.

Modern automotive body design requires closure members, such as hoods, rear deck lids, etc., to have substantial surface continuation with surrounding parts of the body, with no large spacings between their respective marginal edges and with all hinges and supports concealed from external view. This is especially the case with the modern engine compartment hood. The hinges connecting the hood to the body are generally of the concealed type and arranged to provide the hood with a bodily shifting movement as well as pivotal movement during opening to accommodate the relatively close relation of the hinged edge of the hood with the body. These hinges which are fixedly pivoted to the body normally serve to prevent any interference between the hood and body during hood openings, however, due to minor variations in dimensions of parts coupled with their deflection underload, it frequently happens that the hinged edge of the hood comes into contact with the highly finished surface of the surrounding body structure with resultant damage.

It is accordingly among the objects of the instant invention to so improve the structure of such closure members and the body portions adjacent thereto that all likelihood of their interference during operation will be eliminated; to provide these improvements in the form of cooperating brackets attached to the closure member and adjacent body structure respectively; to locate such brackets where they will be substantially concealed from external view yet will be effective throughout the range of hinging movement of the closure member; and to provide such brackets in a form which may be cheaply constructed and readily adapted to existing automotive bodies.

In the drawings Figure 1 is a perspective view of a portion of an automotive vehicle body showing my invention applied to a one-piece side opening type hood for the vehicle engine compartment.

Figure 2 is an enlarged sectional view taken

2 substantially on line 2—2 of Figure 1, the hood being shown in closed position.

Figure 1:
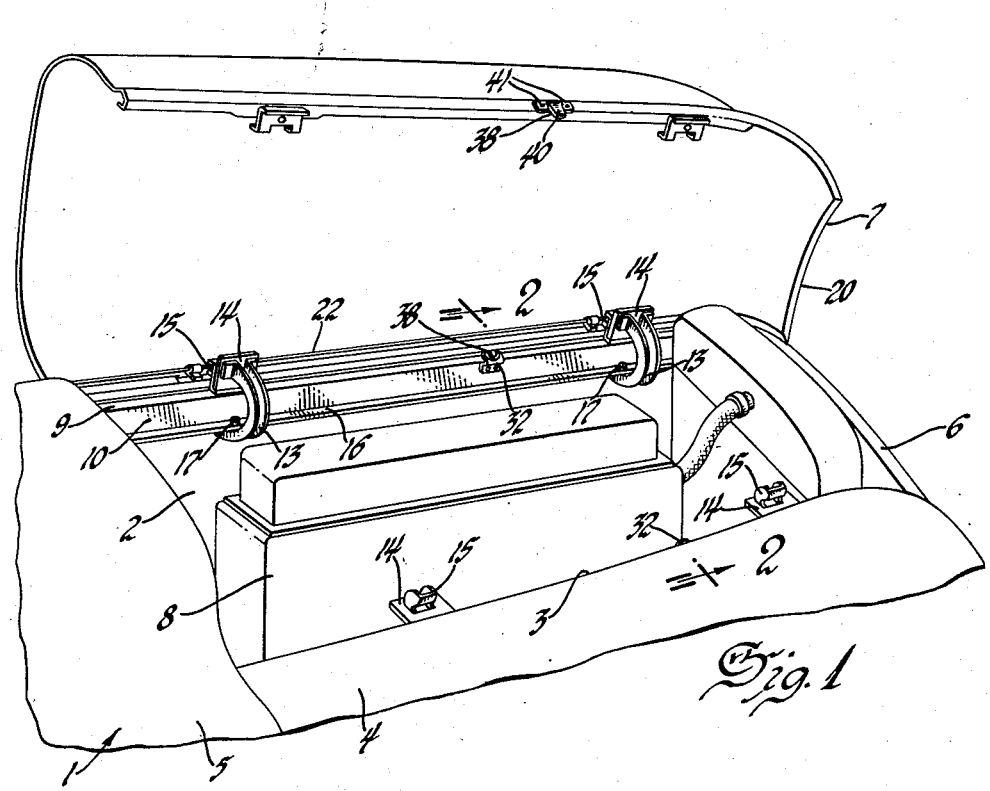
Figure 2:
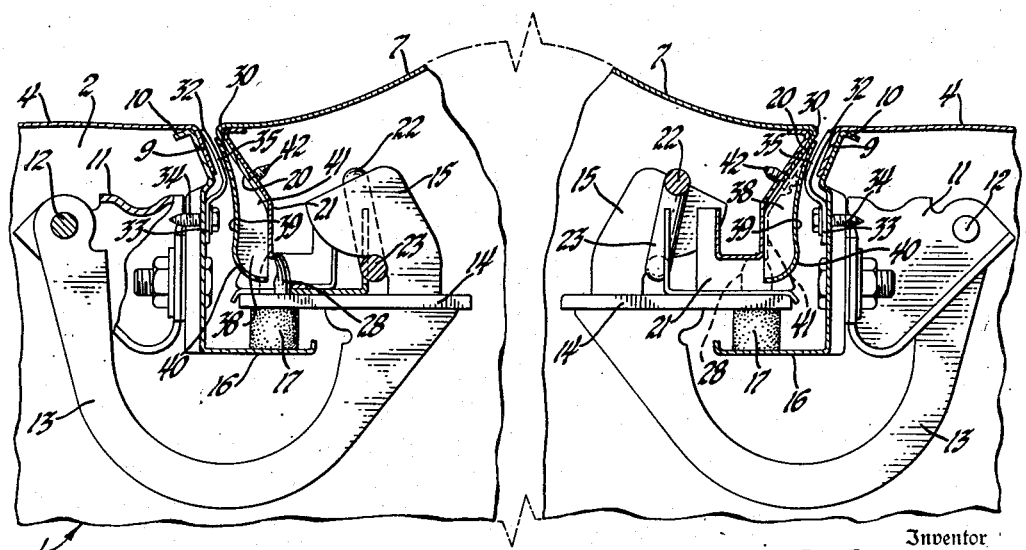

Referring first to Figures 1 and 2 of the drawings, there is illustrated a portion of an automotive vehicle body 1 having a compartment 2 for the engine 8, access thereto being provided through an opening 3 defined by the upper external surface of fenders 4, cowl 5 and grille 6. Normally closing the opening 3 to the engine compartment is a hood 7 which in closed position has its external surface in substantial continuation with the external surfaces of the fenders 4 as shown in Figure 2. A similar surface continuation exists between the hood 7 and the cowl 5 when the hood is closed.

The marginal extremities of the fenders 4 adjacent the hood are bent downwardly to form flanges 9, and reinforcing these flanges are fender rails 10 to which are fixedly mounted brackets 11 providing pivots 12 for the goose neck hinge leaves 13. The free ends of these hinge leaves 13 are provided with pad portions 14 from which project hooks 15. A horizontal ledge 16 provided by each fender rail 10 supports a cushion 17 of rubber or the like upon which the pad 14 of the hinge leaf 13 normally rests.

Each side marginal edge of the hood 7 is turned down to form a flange 20 opposite the flange 9 on the fender, and to this flange is attached a hood reinforcing rail 21, the bottom surface of which is adapted to abut the pad 14. 22 indicates a rod suitably journaled by the hood and having U-shaped portions 23 which are adapted to be swung into engagement with the hook portion 15 of the hinges when it is desired to lock that side of the hood closed. Dowels 28 projecting from the pads 14 serve to locate the hood laterally, the rails 21 being suitably apertured to receive the dowels while in engagement with the pads.

It will be understood from Figure 2 that the hinge structure just described is duplicated on each side of the engine compartment opening 3 in order that the hood may be opened from either side after releasing its respective locking rod 22, the hinge leaves 13 on the opposite side of the hood remaining locked to the hood and controlling its pivotal movement about the hinge pivot 12. Since it is desirable that the side marginal edges of the hood be in closely spaced relation to the fender inner marginal edges when the hood is closed, there is considerable danger unless extreme care is employed in the selection and assembly of the parts that the portion 30 of the hood will strike the painted external surface of the fender either during opening of the hood or upon the hood reaching its fully opened position. Further, the weight of the hood, particularly when fully open, tends to aggravate this condition and it frequently happens that there is sufficient deflection either in the hinges or their mounting that the edge 30 of the hood will strike the fender. As a means to prevent this possibility I provide cooperating abutments on the fender and hood flanges 9 and 20 respectively which operate to insure against the hood coming close enough during or at full open position to contact the fender. In Figure 2 these abutments are shown in the form of a bumper 32 having a generally Z-shaped configuration, with the lower leg 33 thereof fixedly secured to the bracket 10 as by one or more bolts 34. This bumper is preferably made of hard brass and has its upper leg 35 overlying the flange 9 of the fender and spaced slightly therefrom. It will be noted that this upper leg terminates adjacent the upper edge of the flange 9 so as not to interfere with the external surface configuration of the fender and hood. Preferably also the side of the leg 35 facing the hood has a curvature approximately on a radius with the hinge pivot 12.

The other abutment member as shown in Figure 2 consists of a guide piece 38 having a curved surface 39 also on a radius from the hinge pivot 12. This guide piece 38 which may suitably be formed as a sheet metal stamping has an elongated channel shaped body portion 40, from opposite sides of which extend integral ears 41. Bolts 42 extending through apertures in the ears 41 serve to anchor the guide piece to the flange 20 and hood rail 21 as shown. An important feature of this guide piece is that the surface 39 thereof has sufficient length to cooperate in abutting relation with the bumper 32 throughout the range of hinging movement of the hood 7, and its curvature above the hinge pivot 12 serves to maintain the surface 39 in close cooperating relation with the bumper during this movement. It is not necessary that the upper portion of the surface 39 of the guide piece be in contact with the bumper leg 35 when the hood is closed, a slight separation between them at this time being preferred to eliminate possible rattle.

Figure 3:
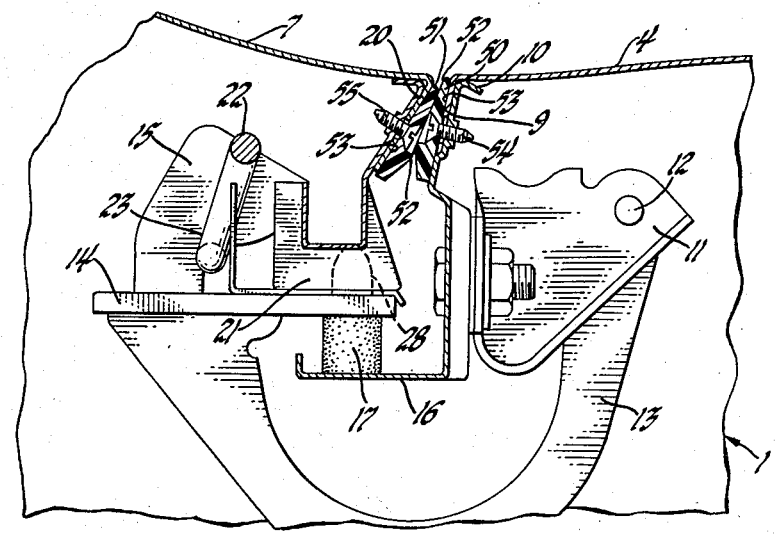
Figure 3 is a fragmentary view similar to Figure 2 but showng a modification of my invention.

In Figure 3 is shown a modification of my invention wherein the cooperating abutment members are in the form of pads 50 and 51 of plastic material, e. g. "Bakelite," pad 50 taking the place of the bumper 32 previously described and pad 51 being substituted for the guide piece 38. Each of these pads is generally wedge shaped as shown, each having a bearing face 52 and a bottom face 53 in diverging relation. The bottom face 53 of the bumper pad 50 is held in clamped engagement with the flange 9 of the fender by means of one or more screws 54, and similarly screws 55 clamp the bottom face 53 of the guide pad 51 to the flange 20 of the hood, the heads of the screws being countersunk below the bearing surfaces 52, respectively, as shown. Bearing surfaces 52 considerably overlap each other in the hood closed position and have sufficient length that portions thereof will remain in engagement throughout the full range of the lifting movement of the hood. By reason of the wedge shape of the pads 50 and 51, each increasing in thickness from its upper end downwardly, their bearing surfaces 52 tend to remain in contact with each other as the pad 51 moves about the hinge pivot 12.

Figure 4:
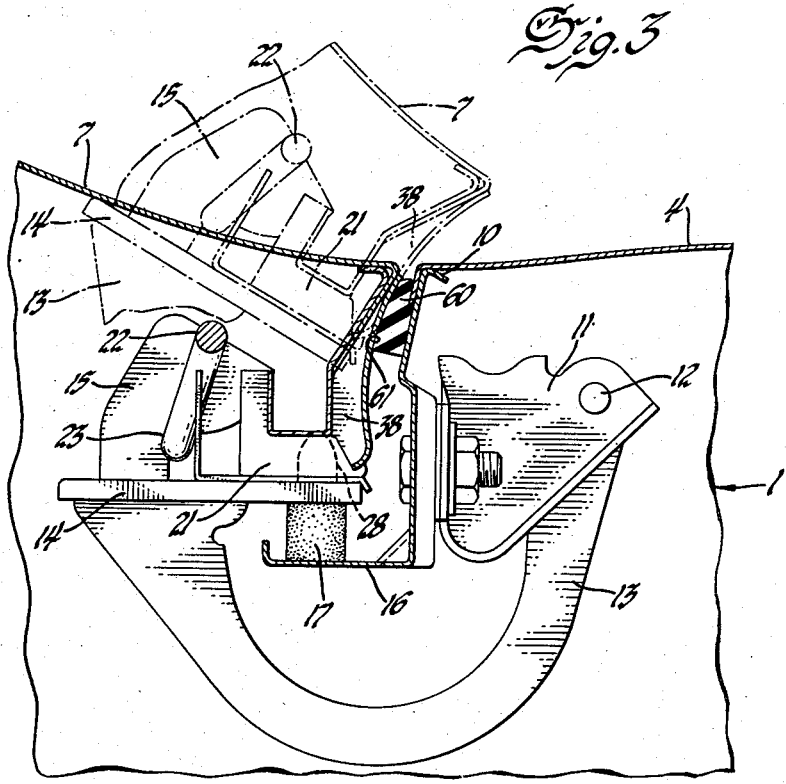
Figure 4 is a view similar to Figure 3 but showing a further modification of my invention.

In Figure 4 I have shown a modification of my invention which is generally similar to that of Figures 1 and 2 but differs principally therefrom in that the bumper 60 is formed of rubber and is slidably engaged by the guide piece 38 throughout the range of lifting movement of the hood 7. The bumper member 60 preferably has a curved surface 61 opposite the guide piece on a radius with the hinge pivot 12. The bumper 60 may alternatively be formed of a moldable plastic such as "Bakelite." In Figure 4 I have indicated the position of the hood in open position by dotted lines and in its closed position by solid lines, and it is believed readily apparent that the bumper 60 and cooperating guide piece 38 effectively insure against any damage to the external surface of the fender by the hood during hood opening and closing.

I claim:

1. The combination in an automotive vehicle body having an engine compartment accessible through an opening defined at its opposite sides by the vehicle fenders and a hood normally closing the opening and pivotable about either fender to an open position, of normally concealed hinges for the hood on opposite sides of the opening each including a goose neck hinge leaf having one of its ends connected to its associated fender for pivotal movement about an axis and its opposite end adapted to be releasably fixed to the hood, a bumper on each fender between its associated hinge axis and the adjacent edge of the hood, and a guide on each side of the hood facing the respective bumpers, each pair of said bumpers and guides having cooperating faces formed on an arc substantially concentric with the pivotal axis of the hinge associated with their respective side of the hood, the arcuate length of said guide face being sufficient to overlap said bumper face throughout the range of hinged movement of the hood.

2. In an automotive vehicle having an opening for access to a compartment thereof and a closure hinged to the body at opposite sides of the opening, a pair of slidably abutting wedge-shaped members between the closure and the body on each side of the opening, one of the members of each pair being secured to the closure and the other being secured to the body, both members of each pair having the thickest portion of their wedge-section disposed inwardly of the compartment opening.

3. In an automotive body having an external surface provided with an opening for access to a compartment of the body, a closure for the opening having an external surface normally in substantial continuation with the body external surface, hinge means normally concealed by said external surfaces for pivotally connecting the closure to the body about an axis laterally disposed from the opening, cooperable bumper and guide members between said axis and closure on the hinged side of the opening, one on the body and the other on the closure, each of said members being disposed below their respective body and closure external surfaces so as to be concealed from view when the closure is in closed position, said guide member having a bumper member engageable surface on an arc concentric with the pivotal axis of the hinge means, and of a length sufficient to overlap said bumper surface throughout the full range of hinged movement of the closure.

4. The combination in an automotive vehicle body having an engine compartment accessible through an opening defined at opposite sides by the vehicle fenders and a hood normally closing the opening and pivotable about either fender to an open position, of hinges for the opposite sides of the hood each including a goose neck hinge leaf having one of its ends pivotally connected on an axis to its associated fender and its other end adapted to be releasably fixed to the hood, a bumper on each fender between its associated hinge axis and the adjacent side edge of the hood, and a guide on each side of the hood facing the respective bumpers, each of said bumpers having a guide engaged surface concentric with the pivotal axis of the hinge associated with its side of the hood, said guides being of sufficient length to overlap their respective bumpers throughout the range of hinged movement of the hood.

5. The combination in an automotive vehicle body having an engine compartment with an opening defined at opposite sides by the vehicle fenders and a hood adapted to recess between the fenders in effecting a closure of the opening, of hinges for connecting the respective sides of the hood to the fenders each including a hinge leaf pivotable about a fixed axis on the fender, releasable latches carried by the hood for independently fixing the sides of the hood to their respective hinge leaves, a bumper of soft rubber or equivalent material secured to each fender between its associated hinge axis and the adjacent side of the opening, and a guide secured to each side of the hood opposite the respective bumpers, each set of said bumpers and guides having their respective oppositely disposed surfaces in mutual sliding engagement throughout the range of movement of the hood about the axis of its associated hinge.

6. The combination in an automotive vehicle body having an opening for access to a compartment thereof and a closure hingeable to the body at either side of the opening for movement about respective axes, of a bumper and a guide each of Bakelite or the like, one on the body and the other on the closure at each side of the opening, said bumper being disposed between its associated guide and hinge axis, cooperating surfaces on said bumpers and guides slidably accommodating their relative movement throughout the range of hinged movements of the hood about the respective axes.

7. The combination in an automotive vehicle body having an opening in a wall thereof and a hinged flush fitting closure for the opening, a pair of cooperating abutments concealed by the wall and closure when the opening is closed and arranged to spacedly separate the juxtaposed edges of the wall and closure during hinged movements of the closure, one of said abutments constituting the free end of a cantilever spring bumper having its oppositely disposed end fixed to the body, the other of said abutments being fixed to the closure and having its bumper engageable surface concentric with the axis of hinged movement of the closure, said bumper being disposed intermediate said other abutment and said axis.

GEORGE R. BAYLEY.

References Cited in the file of this patent

UNITED STATES PATENTS

| Number | Name | Date |
| --- | --- | --- |
| 1,416,816 | Gravel | May 23, 1922 |
| 1,538,121 | Kumler | May 19, 1925 |
| 1,921,261 | Potter | Aug. 8, 1933 |
| 2,311,965 | Reynolds | Feb. 23, 1943 |

FOREIGN PATENTS

| Number | Country | Date |
| --- | --- | --- |
| 688,978 | France | Sept. 1, 1930 |